J. WIELAND.
COMBINATION HOG HOOK AND GAMBREL.
APPLICATION FILED OCT. 28, 1915.
1,174,786.
Patented Mar. 7, 1916.
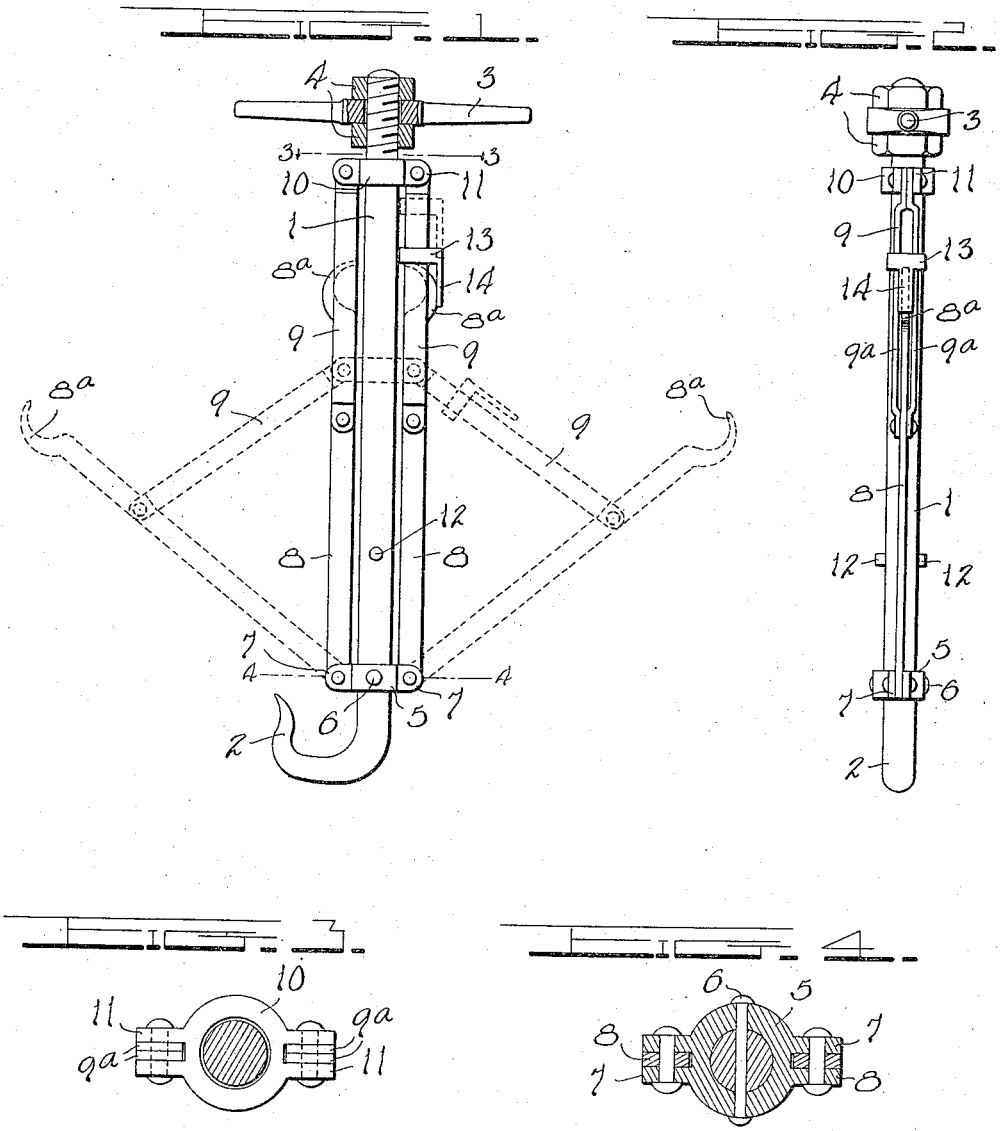
Inventor
JOZIAS WIELAND
By H. S. Hie
Attorney

UNITED STATES PATENT OFFICE.

JOZIAS WIELAND, OF CENTRAL LAKE, MICHIGAN.

COMBINATION HOG HOOK AND GAMBREL.

1,174,786.

Specification of Letters Patent.

Patented Mar. 7, 1916.

Application filed October 28, 1915. Serial No. 58,388.

*To all whom it may concern:*

Be it known that I, JOZIAS WIELAND, a citizen of the United States, residing at Central Lake, in the county of Antrim, State of Michigan, have invented a new and useful Combination Hog Hook and Gambrel; and I do hereby declare the following to be a full, clear, and exact description of the invention, such as will enable others skilled in the art to which it appertains to make and use the same.

The present invention relates to a combined hog hook and gambrel, and has for its object to provide a device of this character which embodies novel features of construction whereby the gambrel can be collapsed into an out of the way position when not in use.

Further objects of the invention are to provide a combined hog hook and gambrel which is inexpensive in its construction, which can be easily handled and manipulated, which can be used either as a gambrel or as an ordinary hook, and which is so constructed that the gambrel can be quickly extended or collapsed, as desired.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a front elevation of a combination hog hook and gambrel constructed in accordance with the invention, the gambrel arms being shown in operative position by dotted lines and in inoperative position by solid lines. Fig. 2 is a side elevation thereof. Fig. 3 is a horizontal sectional view taken on the line 3—3 of Fig. 1. Fig. 4 is a horizontal sectional view taken on the line 4—4 of Fig. 1.

Corresponding and like parts are referred to in the following description and indicated in all the views of the drawing by the same reference characters.

Specifically describing the present embodiment of the invention, the numeral 1 designates an upright rod or bar which constitutes the stock of the device, the lower end of the bar being provided with an integral hook, 2, while the upper end thereof is provided with a handle 3. The handle is detachably applied to the bar, being shown in the present instance as provided at its middle portion with an opening receiving the bar, and nuts 4 being threaded upon the bar both above and below the handle. These nuts can be tightened against the handle so as to hold the latter rigidly in position with the ends thereof projecting laterally upon opposite sides of the bar or rod 1.

Fitted upon the lower end of the rod 1 at a point just above the hook 2 is a collar 5, said collar being held rigidly in position by suitable means such as the pin 6. Opposite sides of the collar are provided with the forked lugs or arms 7 within which the inner ends of the gambrel arms 8 are pivotally mounted. The outer ends of the gambrel arms 8 terminate in the usual hooks $8^a$, and link members 9 pivotally connect the gambrel arms 8 to a slide 10 which is mounted to reciprocate up and down upon the rod 1. This slide 10 is provided upon opposite sides thereof with the forked lugs 11 between which the upper ends of the links 9 are pivoted, the lower and outer ends of the links being pivotally connected to the gambrel arms 8 at a point slightly spaced from the hooked extremities $8^a$ thereof. These link members 9 comprise two spaced bars $9^a$ the lower ends of which are connected to the gambrel arms upon opposite sides thereof, as is clearly shown by Fig. 2, so that the hooks $8^a$ of the gambrel arms can be housed between the spaced bars when the gambrel arms are collapsed.

When the slide 10 is moved upwardly upon the rod 1 the gambrel arms 8 are swung upwardly and collapsed against opposite sides of the rod 1, the gambrel being then inoperative. When in this collapsed condition the hooks $8^a$ of the gambrel arms 8 are housed between the bars $9^a$ of the link members 9 so as to prevent them from coming into contact with and injuring the hands of the operator or objects. However, when it is desired to use the gambrel, it is merely necessary to swing the gambrel arms 8 outwardly and downwardly and lower the slide 10 on the rod 1. When the gambrel arms reach the lower limit of their movement, the slide 10 will engage a stop 12 on the rod 1 and lock them against further movement. It will thus be obvious that the device can be used either as a gambrel or as an ordinary hook, and that the gambrel arms can be readily collapsed against the rod 1, or distended into operative position.

It is desirable to provide means for holding the gambrel arms in a collapsed position and so prevent them from accidentally spreading, and for this purpose a locking slide 13 is mounted upon one of the link members 9, the said locking slide being formed with a depending tongue or extension 14. This tongue 14 is adapted to engage the back of the hook of the gambrel arm so as to prevent the gambrel arms from accidentally distending, as shown by solid lines upon the drawings, although when the slide is moved upwardly so as to disengage the tongue 14 from the gambrel arm as shown in dotted lines upon Fig. 1, the gambrel arms are allowed to swing outwardly into operative position.

Having thus described the invention, what I claim as new and desire to secure by Letters Patent, is:—

1. A device of the character described, including an upright rod, a handle at the upper end thereof, pivotally mounted gambrel arms carried by said rod and arranged upon opposite sides thereof, link members having one end thereof connected to the gambrel arms and the opposite ends thereof connected so as to slide up and down upon the upright rod, the sliding up and down of the said ends of the links upon the rod causing the gambrel arms to collapse against the rod or swing outwardly into operative position, and a lock member mounted upon one of the link members, said lock member being adapted to engage one of the gambrel arms to hold the same in a collapsed position.

2. A device of the character described including an upright rod, a handle at one end thereof, pivotally mounted gambrel arms carried by the said rod, link members having one end thereof connected to the gambrel arms and the opposite ends thereof slidably engaging the rod, the sliding of the said ends upon the rod causing the gambrel arms to collapse against the rod or swing outwardly into operative position, and a lock member slidably mounted upon one of the link members and adapted to frictionally engage one of the gambrel arms to hold the same in a collapsed position against the rod.

In testimony whereof I have signed my name to this specification in the presence of two subscribing witnesses.

JOZIAS WIELAND.

Witnesses:
STUART P. BAAR,
G. C. TOWNSEND.

Copies of this patent may be obtained for five cents each, by addressing the "Commissioner of Patents, Washington, D. C."